United States Patent [19]

White

[11] 4,344,214
[45] Aug. 17, 1982

[54] INTERNAL PIPE LINE DELIVERY DEVICE

[75] Inventor: Lawrence J. White, San Jose, Calif.

[73] Assignee: Raychem Corporation, Menlo Park, Calif.

[21] Appl. No.: 174,289

[22] Filed: Jul. 31, 1980

[51] Int. Cl.³ ............................................. B23P 19/04
[52] U.S. Cl. ................................... 29/252; 29/281.1; 228/216
[58] Field of Search ......................... 60/632, 636, 635; 228/22, 57, 214, 219, 216, 50, 49; 29/281.1, 282, 252, 234, 235, 237

[56] References Cited

U.S. PATENT DOCUMENTS

| | | | |
|---|---|---|---|
| 2,564,209 | 8/1951 | Murphy | 60/632 |
| 3,425,614 | 2/1969 | Clark | 228/49 |
| 3,553,812 | 1/1971 | Weaver | 29/203 |
| 3,750,928 | 8/1973 | Valentine | 228/44 |
| 3,937,382 | 2/1976 | Cunningham et al. | 228/49 |
| 3,960,311 | 6/1976 | Griffiths | 228/49 |
| 4,053,973 | 10/1977 | Meli | 29/252 |
| 4,081,964 | 4/1978 | Bendler et al. | 60/636 |

FOREIGN PATENT DOCUMENTS

| | | |
|---|---|---|
| 660158 | 5/1938 | Fed. Rep. of Germany . |
| 2395489 | 1/1979 | France . |
| 2434330 | 3/1980 | France . |

*Primary Examiner*—Robert C. Watson
*Attorney, Agent, or Firm*—James W. Peterson; Herbert G. Burkard

[57] ABSTRACT

The invention is a remotely thermally activatable device for delivering a payload to a pre-determined location within a pipe comprising a carrier means for supporting the payload, a driver means to axially move the carrier means, and a thermally activatable trigger means connected to the driver means to actuate the driver means. In operation, the device and payload may be placed in a location within a pipe, for example, near the end of a pipe to be welded to an adjoining pipe. Subsequent to such welding, the instant invention may be remotely activated by outside heating of the pipeline in the vicinity of the device, thereby causing the device to move the payload to the pipe weld.

18 Claims, 12 Drawing Figures

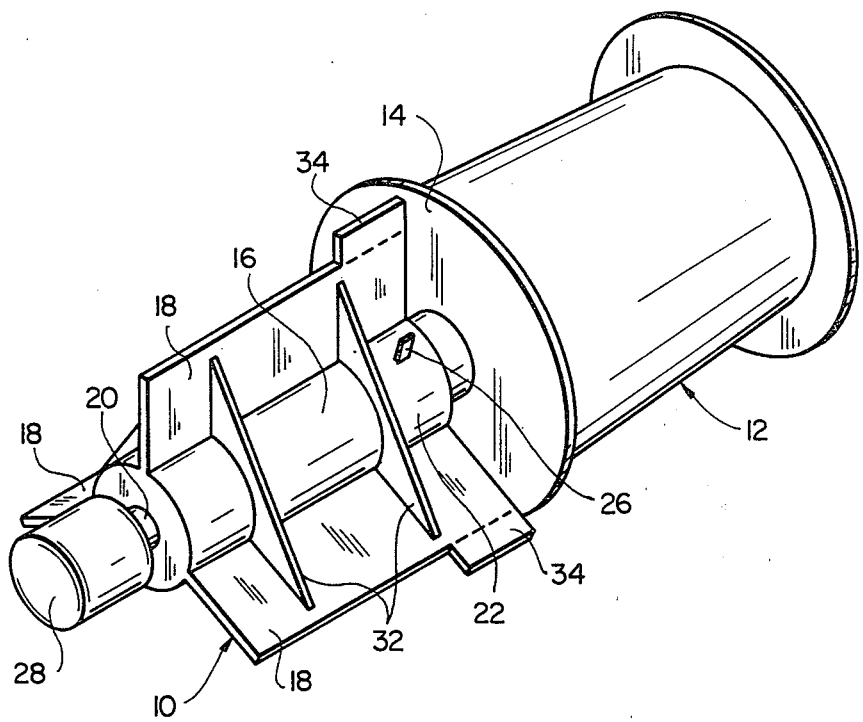
FIG_1
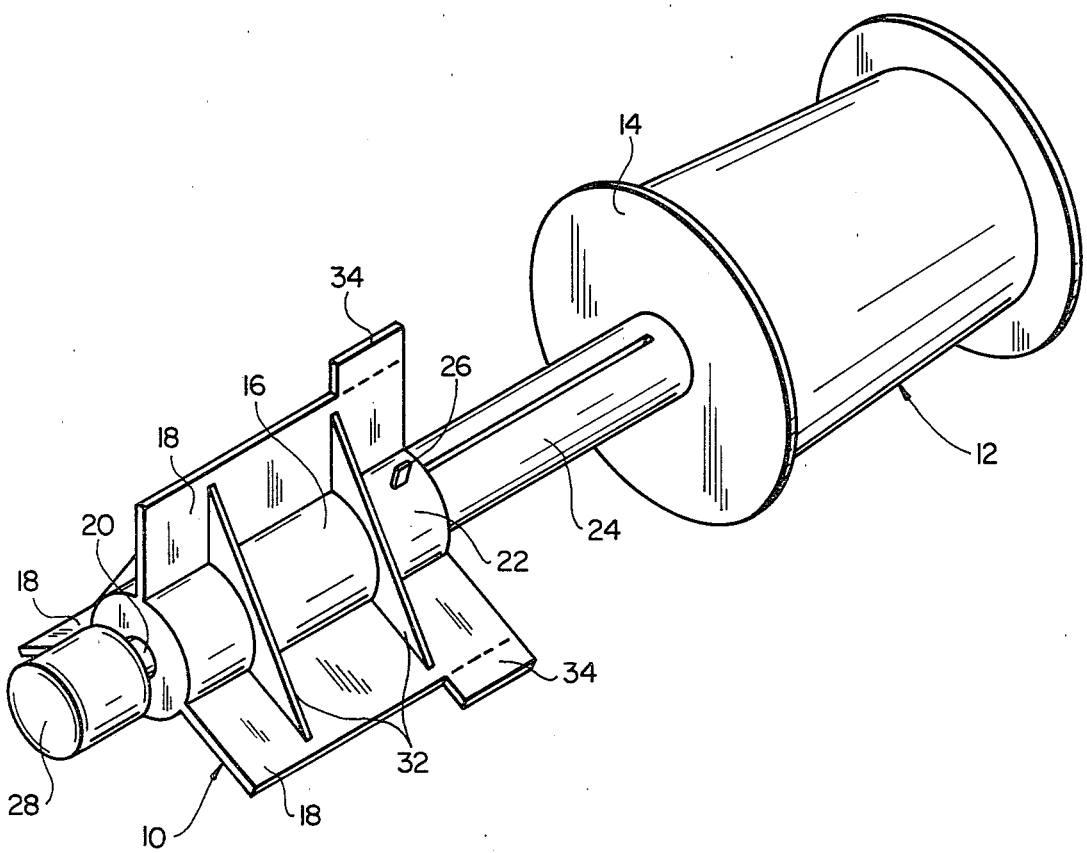
FIG_2

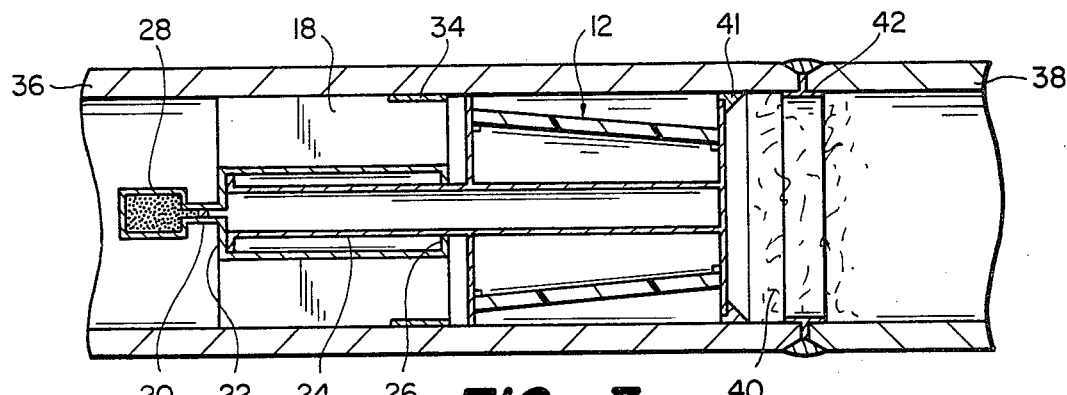
FIG_3
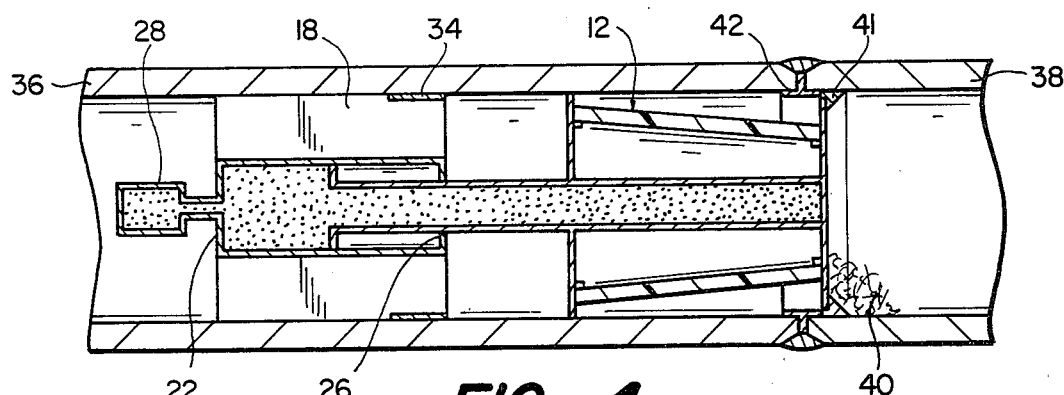
FIG_4
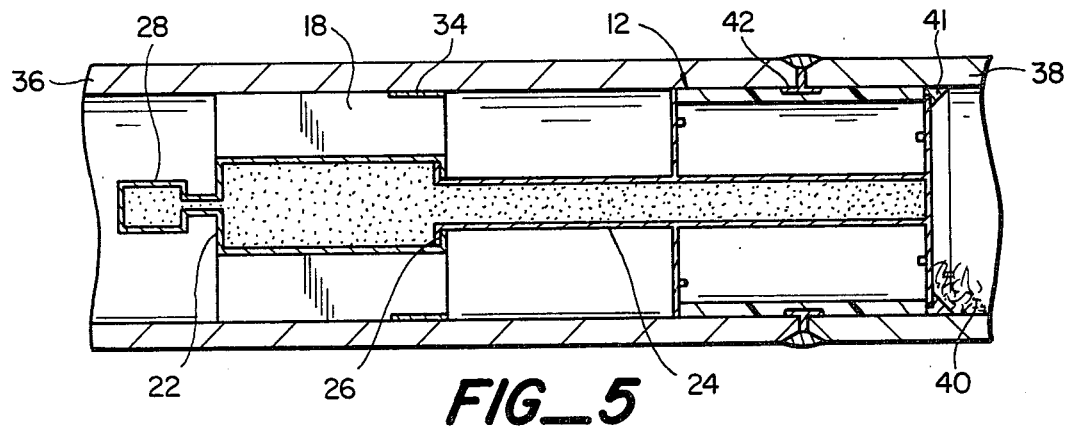
FIG_5
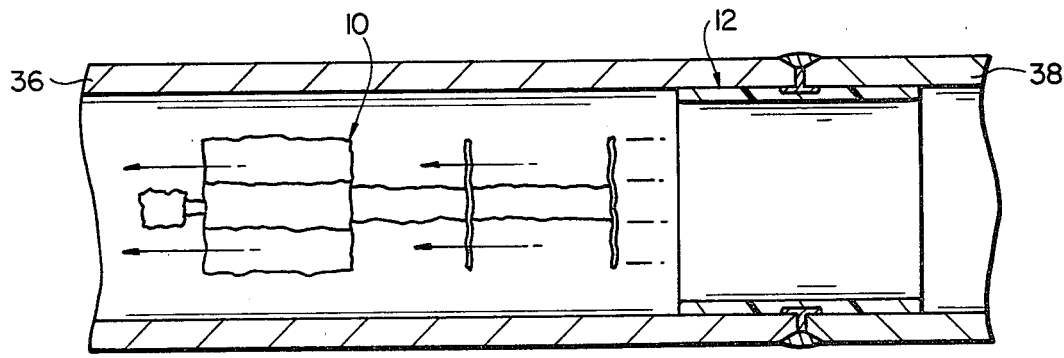
FIG_6

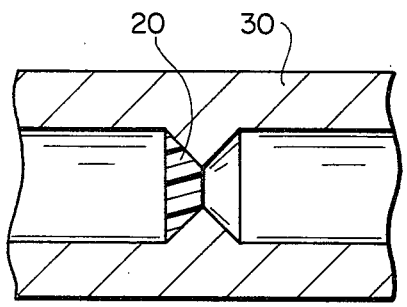
FIG_7
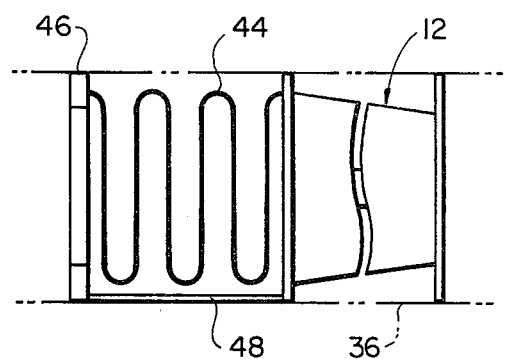
FIG_8
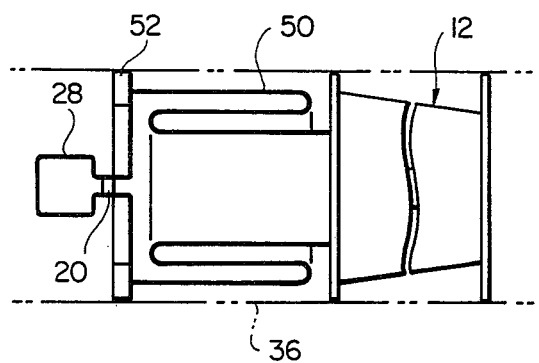
FIG_9
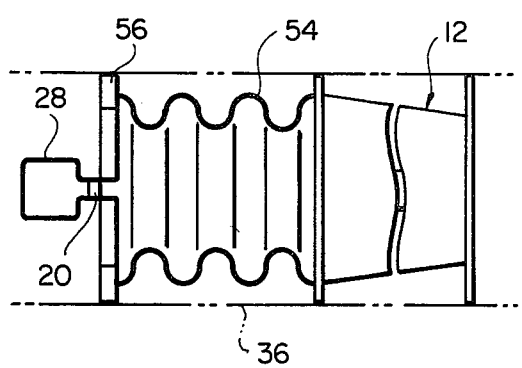
FIG_10
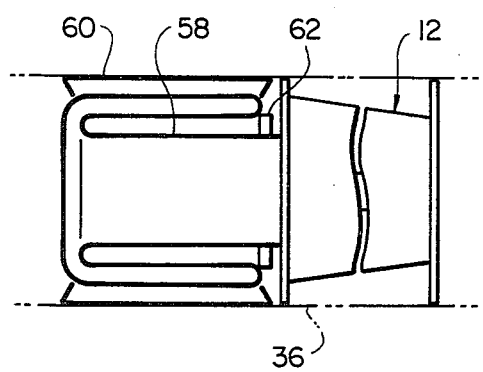
FIG_11
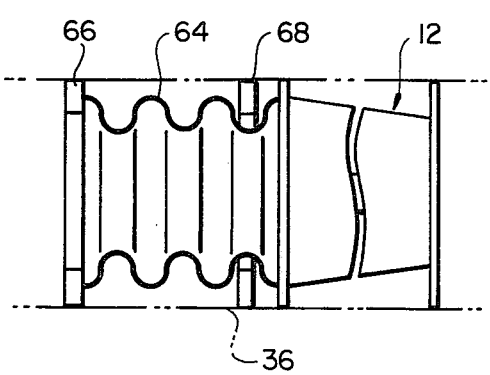
FIG_12

INTERNAL PIPE LINE DELIVERY DEVICE

BACKGROUND OF THE INVENTION

In the manufacture of construction of reactors, pipes, valves, and other enclosed fluid-handling process equipment it is often necessary to employ welding operations to join component parts together. Where such equipment is designed to handle corrosive fluids, precautions must be taken to keep the fluids from contacting the equipment. As a result, individual components such as pipes may be coated on their interior surfaces to protect the surfaces from the action of the corrosive materials. However, when the inner surface of the finished article is subjected to a welding procedure, the now inaccessible inner surface coating is generally damaged, either by the welding operation itself, or by removal prior to welding to prevent contamination of the weld area, leaving an exposed area subject to corrosion. It is therefore highly desirable to find a means of protecting such an exposed area and further to find a means which may be inserted into the pipe section while it is accessible. To this end, an internal pipe protection device has been developed and is the subject of co-pending and co-assigned U.S. patent application Ser. No. 174,304, filed July 31, 1980. The aforementioned device may be inserted into a pipe section before the welding of said section to an adjoining section. Subsequent to the welding procedure, and after the weld area has cooled, the pipe protection device may be positioned directly under the weld area and remotely activated to provide a protective lining for said exposed section. The problem of moving such a pipe protection device or other similar device (hereafter referred to generally as a "payload") is solved by the instant invention, which is a remotely thermally activatable device for accurately delivering a payload to a pre-determined location within a pipe.

The problem of the placement of devices within a pipe has been addressed previously. For example, U.S. Pat. No. 3,135,047 to A. R. Houser discloses the use of propping supports to position a backing member within a pipe during a welding operation. Houser specifically teaches that such a propping support should be removable and to that end may be made of a substance which may be dissolved or broken up and flushed from the relatively inaccesible chamber. In the instant invention, the payload requires more than just radial and axial support within the pipe since it must be sufficiently remote from, for example, a welding area in order to prevent its damage or premature activation. The instant invention provides a solution to that problem by providing a unique device which will support and shield a payload until such time as the device is thermally activated by the heating of the pipe in its vicinity, causing it to move the payload to the desired position, and align the payload for operation. Therefore, the instant invention provides a dynamic apparatus for solving a problem previously considered capable of only a static solution.

OBJECTS OF THE INVENTION

It is a primary object of the instant invention to provide a device which may be remotely thermally activated, the device being capable of accurately delivering a payload to a pre-determined location in a precisely aligned fashion, and to hold it in alignment during operation.

It is another object of the instant invention to provide a device which may be destructible subsequent to its operation.

It is yet another object of the instant invention to provide a device which will shield its payload within the environment in which it operates, e.g. from the heat of welding and from wind forces within a pipe.

It is still another object of the instant invention to provide a device which not only positions its payload but also aids in the preparation of the zone into which the payload is delivered.

SUMMARY OF THE INVENTION

The purpose of the instant invention is to provide a remotely thermally activatable device for delivering a payload to a pre-determined location within an inaccessible pipe. To accomplish this purpose, the device of the instant invention provides the combination of a carrier means, a driver means, a support means, and a thermally activated trigger means, with said device being activated by external heating of the pipe to accurately deliver its payload to the predetermined location.

DESCRIPTION OF THE DRAWING

FIG. 1 is a perspective view of an embodiment of the device of the instant invention, with its payload, prior to activation.

FIG. 2 is a perspective view of the device of FIG. 1, with its payload, subsequent to activation.

FIG. 3 is a full section view of the device of FIG. 1, with its payload, positioned within a pipe prior to activation.

FIG. 4 is a full section view similar to FIG. 3 illustrating the device during its operation.

FIG. 5 is a full section view similar to FIGS. 3 and 4 of the device after operation.

FIG. 6 is a full section view similar to FIGS. 3, 4, and 5 subsequent to installation of the payload, illustrating the destructibility of the device.

FIG. 7 is a partial cross sectional view of a thermally activated trigger means of the instant invention.

FIG. 8 is a schematic cross-sectional view of a first alternative embodiment of the instant invention.

FIG. 9 is a schematic cross-sectional view of a second alternative embodiment of the instant invention.

FIG. 10 is a schematic cross-sectional view of a third alternative embodiment of the instant invention.

FIG. 11 is a schematic cross-sectional view of a fourth alternative embodiment of the instant invention.

FIG. 12 is a schematic cross-sectional view of a fifth alternative embodiment of the instant invention.

DESCRIPTION OF THE PREFERRED EMBODIMENT

With continued reference to the drawing, FIG. 1 illustrates in perspective view an embodiment of the device of the instant invention referred to generally at 10, and carrying a payload referred to generally at 12. Device 10 comprises a carrier means 14, a driver means 16, a support means 18, and a thermally activatable trigger means 20.

Driver means 16 is connected to carrier means 14 to axially move carrier means 14 to an extended position as shown in FIG. 2. Here driver means 16 comprises a telescoping cylinder 22 and piston 24. The extension of piston 24 is limited by stop means 26, as can be more clearly seen in FIG. 2. Stop means 26 is shown in a more schematic form in FIGS. 3-6. Driver means 16 is, therefore, basically an expansible chamber which in the preferred embodiment comprises cylinder 22 and piston 24. Driver means 16 further comprises an energizing fluid source 28. In the preferred embodiment, this energizing fluid source 28 is a chamber containing a compressed gas, e.g. air. It is within the scope of the invention to utilize a blowing agent within the chamber, where said agent releases a gas or vapor at a pre-determined temperature corresponding to the temperature required to activate the trigger means. The blowing agent may comprise a chemical which has a suitably low decomposition temperature and which releases a gas on decomposition, such as an azide (which releases nitrogen), or a vaporizable liquid. In either case, whether the energizing fluid source is compressed air or a blowing agent, the pressure required to drive piston 24 is about 2 atm. A vaporizable liquid such as heptane or water has a sufficiently low boiling point that it will easily develop a vapor pressure of that magnitude. Driver means 16 is actuated by thermally activatable trigger means 20, which is shown in FIG. 1 as a fusible plug inserted between the energizing fluid source 28 and the cylinder 22, within conduit 30, as can be more clearly seen in FIG. 7. When the thermally activatable trigger means 20 is heated above its melting point it allows the energizing fluid to enter cylinder 22. A suitable trigger means will have an activation temperature, somewhat above the maximum storage temperature, but well below the activation temperature of the payload if that is heat-activated. Other configurations of conduit 30 and plug 20 are possible, but it is desirable that the trigger means give a rapid release of pressure into the expansible chamber to provide the maximum impulse to the piston.

Driver means 16 is supported by support means 18, as can be more clearly seen in FIGS. 3, 4, and 5. Support means 18 comprises a plurality of radially extending fins which are secured by flanges 32 to cylinder 22. These fins are optimally three in number, to ensure centering and to minimize the mass of the device. Fins 18 are further supplemented by foldable flap portions 34, which are clearly shown in FIGS. 3, 4, and 5 securing the entire device 10 in pipe section 36. Support means 18 securely holds driver means 16 during travel of the carrier means 14 to its pre-determined location, which in this instance is the weld joining pipe sections 36 and 38. The weld junction between pipe sections 36 and 38 has been supplemented with a back-up ring 42, which provides a partial obstacle to movement of carrier means 14. It is also shown in FIGS. 3–5 that the vicinity of the weld area contains welding debris 40. Weld debris 40, as shown in FIG. 4, may be cleaned by cleaning means 41 carried on the face of carrier means 14. Cleaning means 41 may comprise a brush-like member or the like which will aid in preparation of the pipe walls in the vicinity of the pre-determined location.

FIG. 5 illustrates the device of the instant invention wherein the driver means 16 has fully extended.

It can be seen somewhat schematically in FIGS. 3 through 5 that an energizing fluid source has in fact expanded the driver means after the thermally activated trigger means has melted.

FIG. 6 illustrates that the device 10 of the instant invention may be destructible after operation. Destructible as used herein includes distortable, dissolvable, dispersable, friable, frangible, and otherwise degradable so that the device may be removed from the interior of the pipe after operation by the application of heat, air pressure or by water flow. It is important, however, that even a destructible device should be capable of prolonged storage under adverse temperature and humidity conditions.

Among suitable materials may be mentioned, by way of example only, the following: distortable materials—natural and synthetic rubbers; dissolvable or dispersable materials—hydroxyalkyl cellulose, polyvinyl alcohol, paper products with soluble glues; friable or frangible materials—cardboard, paper pulp, rigid foams (especially those containing a high-temperature blowing agent); vaporizable materials—thermally depolymerizable materials such as poly($\alpha$-methyl styrene), polyacetals, irradiated polymers; flushable materials (for the energizing fluid source chamber)—polyethylene, polymers of low gas permeability.

Carrier means 14 may also perform additional shielding functions both as a shield from, for example, the heat generated in the weld area when the device is positioned as in FIG. 3, and also in general as a wind barrier from wind in the pipes. Carrier means 14 may further serve to hold the payload in alignment during operation. For example, when the payload comprises an expandable pipe liner device, carrier means 14 may serve to align it during expansion.

Although cardboard parts will, in general, have adequate heat resistance, they (or any polymeric parts desired) may have a metallic coating applied to provide further resistance.

FIG. 8 discloses in schematic fashion the first alternative embodiment of the instant invention wherein the driver means comprises a compressed spring-like member 44. Spring-like member 44 is retained in compression by a compression retainer shown as collar 46 (which is connected to the inner wall of the pipe) and a trigger means in the form of a clip 48 made from a thermoplastic or low-melting metallic alloy, which melts and fractures to release the spring-like member 44.

FIG. 9 discloses a second alternative embodiment of the instant invention utilizing a driver means which is an expansible chamber in the form of a rolling diaphragm chamber 50 and energizing fluid source 28. Rolling diaphragm chamber 50 is secured to the inside of the pipe by a support means in the form of a retention collar 52. Energizing fluid source 28 communicates with rolling diaphragm chamber 50 via a thermally activatable trigger means shown as a wax plug 20.

FIG. 10 illustrates a third alternative embodiment of the instant invention utilizing a driver in the form of an expansible chamber and specifically in the form of a tubular bellows 54, which is supported by retention ring 56 and is connected to energizing fluid source 28 via wax plug 20. A similar embodiment (not depicted in the drawing) may comprise an expansible chamber in the form of a balloon, where limitation on expansion either by the pipe wall or by a cylinder inside which the balloon is placed converts the volume expansion to a linear extension, moving the carrier means into position.

FIG. 11 illustrates a fourth alternative embodiment of the instant invention wherein the driver means comprises another compressed spring-like member in the form of rolling diaphragm chamber 58 which is retained by a compression retention device 60, much as spring-like member 44 is retained by fusible clip 48 in FIG. 8. Rolling diaphragm chamber 58 is a sealed chamber which contains, in the configuration of FIG. 11, a pressurized fluid which will expand the chamber once released by the compression retention device 60. The compression retention device 60 will melt on heating of the pipe wall.

FIG. 12 illustrates a fifth alternative embodiment of the instant invention similar to the device shown in FIG. 11 wherein the driver means comprises a tubular bellows 64 containing a fluid under pressure, said pressure being maintained by support means in the form of a collar 66 attachable to the inside of the pipe and a thermoplastic collar 68 which fractures or is thermally activated upon heating of the pipe wall.

Though the embodiments of FIGS. 8 through 12 have been depicted as being supported within the pipe generally by collar-like support means, it is possible that they may be supported by a support means such as is illustrated in detail in FIGS. 1-5. Conversely, it is possible that the driver means of the embodiment of FIGS. 1-5 may be supported by a simpler support means. It is within the scope of the invention to have the driver means 16 expand radially as in the case of a balloon-like chamber to contact the inside wall of a pipe for support. Indeed, the choice of support means will depend much on the pipe diameter and the payload mass, and one skilled in the art should, having regard to his own knowledge and with this disclosure before him, be able to devise a suitable support means.

While the specification has referred extensively to positioning a payload near a pipe weld, it should be understood that this invention is of general application to the placement of a payload within an inaccessible pipe by use of a thermally activatable device.

Although the present invention has been described in considerable detail with reference to certain preferred embodiments thereof, variations are possible within the scope of the invention. Therefore, the spirit and scope of the appended claims should not necessarily be limited to the description of the preferred embodiments contained herein.

What is claimed is:

1. A remotely thermally activatable device for delivering a payload to a predetermined location within a pipe comprising:
    carrier means for radially and axially supporting a payload;
    driver means connected to said carrier means to axially move said carrier means within a pipe, said driver means extending axially and moving said carrier means when activated;
    support means connected to said driver means to support said driver means within a pipe; and
    thermally activatable trigger means connected to said driver means to actuate said driver means, said driver means moving said carrier means within the pipe with respect to said support means.

2. A device as in claim 1 wherein said carrier means, driver means, support means and trigger means are destructible.

3. A device as in claim 1 wherein said driver means comprises an expansible chamber and an energizing fluid source interconnected by said thermally activatable trigger means.

4. A device as in claim 3 wherein said energizing fluid source comprises a chamber of compressed gas.

5. A device as in claim 3 wherein said energizing fluid source comprises a chamber containing a blowing agent.

6. A device as in claim 3 wherein said expansible chamber comprises a telescoping cylinder and complementary piston.

7. A device as in claim 3 wherein said expansible chamber comprises a rolling diaphram chamber.

8. A device as in claim 3 wherein said expansible chamber comprises a tubular bellows.

9. A device as in claim 1 wherein said driver means comprises a spring-like member and said thermally activatable trigger means comprises a spring retainer.

10. A device as in claim 9 wherein said spring-like member comprises a sealed telescoping cylinder and complementary piston.

11. A device as in claim 9 wherein said spring-like member comprises a sealed rolling diaphram chamber.

12. A device as in claim 9 wherein said spring-like member comprises a sealed tubular bellows.

13. A device as in claim 9 wherein said spring-like member comprises a generally helical spring.

14. A remotely thermally activatable device for delivering a payload to a predetermined location within a pipe comprising:
    carrier means for radially and axially supporting a payload;
    a spring-like member connected to said carrier means to axially move said carrier means within a pipe, said spring-like member extending axially and moving said carrier means when released;
    support means connected to said spring-like member to support said spring-like member within a pipe; and
    thermally activatable spring retainer connected to said spring-like member to release said spring-like member, said spring-like member moving said carrier means within the pipe with respect to said support means.

15. A device as in claim 14 wherein said spring-like member comprises a sealed telescoping cylinder and a complimentary piston.

16. A device as in claim 14 wherein said spring-like member comprises a sealed rolling diaphragm chamber.

17. A device as in claim 14 wherein said spring-like member comprises a sealed tubular bellows.

18. A device as in claim 14 wherein said spring-like member comprises a generally helical spring.

* * * * *